Feb. 9, 1965  G. W. MORROW, JR., ETAL  3,169,075
MINERAL SURFACING GRANULES CONTAINING CALCINED CLAY

Filed Nov. 14, 1957

INVENTORS
GEORGE W. MORROW, JR.
NORMAN B. SACKRISON
BY

ATTORNEYS

United States Patent Office 3,169,075
Patented Feb. 9, 1965

3,169,075
MINERAL SURFACING GRANULES CONTAINING CALCINED CLAY
George W. Morrow, Jr., Evanston, and Norman B. Sackrison, Skokie, Ill., assignors to Central Commercial Company, Chicago, Ill., a corporation of Illinois
Filed Nov. 14, 1957, Ser. No. 696,313
22 Claims. (Cl. 117—27)

This application is a continuation-in-part of our co-pending application Serial No. 595,811 filed July 5, 1956, now abandoned.

This invention relates to mineral surfacing material and has particular reference to artificially colored, mineral granules for manufacturing roofing, such as sheets, shingles and siding of bituminously impregnated and coated paper felt for protecting the asphalt coating thereon from the deteriorating action of the weather, and to provide on said coating a granular mineral surfacing material of light color which is pleasing and decorative, non-blooming, resistant to the action of the weather and has a strong tendency to adhere permanently to ashpalt.

It has been proposed to manufacture at low temperatures, light colored roofing granules having a coating which is prepared from the insolubilization of an aqueous mixture of sodium silicate containing titanium dioxide and a lightening agent consisting of finely divided hydrated alumina to hide the dark color of the base granule and produce white and buff colored granules. The materials of such a coating mixture do not make for economical processing of light colored granules, nor does the resultant product of the method fulfill exacting demands of the roofing industry for high quality granules of greater brightness and light reflectivity than is obtainable with hydrated alumina or other expensive materials of the prior art.

It has also been proposed to employ china clay as a lightening or opacifying pigment when used with a binder of sodium silicate and suitable pigments to form on base granule material, white and buff colored granules. One such prior method is disclosed in United States Letters Patent to Teetor et al., No. 2,658,838, wherein the clay is in an amount sufficient to leave on the surfaces of the granule after heat treatment to insolubilize the silicate, a substantial unreacted portion of the clay as a lightening agent to hide the dark color of the base granule—the temperature employed in said method being in the range of from 1500 to 2000° F. to form on the surfaces of the granule a glass-like, or fused coating. Said method cannot be practiced economically, due to the amount of fuel oil required to be used in the heat treatment to insolubilize the silicate.

We have discovered that a finely divided white calcined clay can be used with unexpected results as a low cost inert lightening and brightening agent or pigment extender in a coating comprising one or more reactants, a dispersion of aqueous sodium silicate, titanium dioxide pigment, with or without other pigments, which coating can be applied in any desired thickness to most any of the commonly-used opaque base granule materials and the silicate insolubilized to form on the surface of the granule at temperatures below 1500° F. an exceedingly strong, low-cost, light-colored, non-blooming, weather-resisting and non-porous film of greater brightness and light reflectivity than with other materials of the prior art. This finely divided, white, calcined clay may be used either in processes employing relatively low temperatures, in which case aluminum chloride or other acidic solution is usually applied as an aftercoating and reactant, or it may be used in high-temperature processes, that is, between 1000 and 1500° F., in which case a combination of reactants, such as cryolite and/or a hydrous plastic clay, are usually added to the silicate coating prior to firing.

The special inert clay employed in carrying out our invention is a blend of Georgia clays manufactured by Southern Clays, Inc., 33 Rector Street, New York 6, N.Y., and processed by and sold out of its plant at Gordon, Georgia, under the trademark "Whitetex," which blend of clays comprises the ingredients of the kinds and relative amounts and being characterized substantially as follows:

Fineness:
    Residue on 200 mesh screen—less than 0.2%
    Residue on 325 mesh screen—less than 0.5%
Average particle size:
    1.2 microns, the size distribution being—
        0.0 to 0.5 microns—10%
        0.5 to 1.0 microns—30%
        1.0 to 2.0 microns—30%
        2.0 to 5.0 microns—18%
        5.0 to 10.0 microns— 7%
        10.0 to 35.0 microns— 5%
Particle form: Virtually amorphous
Color: White
Brightness: 90–92% as determined by General Electric Photoelectric Reflection Meter
Oil absorption: .40–.41 gm. per 1 gm. linseed oil
Water soluble salts: Less than 0.2%
pH value: 6.0–6.2
Chemical analysis:
    $Al_2O_3$—43.75%
    $SiO_2$—54.00%
    $Fe_2O_3$—0.25%
    $TiO_2$—0.75%
    $K_2O, Na_2O$—1.25%
Ignition loss: (1600° F. 1 hour)—under 1%
Toxicity: None.
Specific gravity: 2.55.

An object of the invention is a light-colored surfacing granule of superior quality, the coating on which is of greater brightness and light reflectivity than possible of attainment with necessary use of greater amounts of more expensive materials when processing by the methods of the prior art, which said coating is characterized by its excellent weather-resisting and non-blooming properties and ability to permanently adhere to asphalt.

The mineral used in carrying out our method is crushed and screened to the desired size, generally to pass a "10-mesh" screen and be retained on a "35-mesh" screen. The following formulas name the materials of the coating in pounds for one ton of 2000 lbs. of trap-rock, argillite, greystone, diabase, slate, andesite, or most any selected hard opaque mineral commonly used in the roofing industry:

*Formula No. 1—White granules*

| | Pounds |
|---|---|
| "N" brand aqueous sodium silicate | 110.0 |
| Water | 100.0 |
| Tetrasodium pyrophosphate | 2.0 |
| Titanium dioxide | 50.0 |
| Special clay | 80.0 |
| Cryolite | 6.0 |

The granules are thoroughly coated in a tumbling-barrel type mixer, pre-dried, then fired in a rotary kiln at a temperature of about 700° F. for substantially complete dehydration thereof. After dehydration, the granules are cooled to above room temperature (preferably to from about 150° to 200° F.) in a rotary type cooler, during which cooling a solution of an insolubilizing agent such as aluminum chloride, aluminum nitrate or an acid such as hydrochloric acid or nitric acid, is applied to the coated granules to completely insolubilize the silicate. The product is then ready for the market as a non-blooming, weather-resisting, non-fading, light colored granule characterized by its hard, non-porous, insolubilized coating of high brightness and light reflectivity and ability to strongly adhere to asphalt.

*Formula No. 2—White granules*

| | Pounds |
|---|---|
| "N" brand aqueous sodium silicate | 110.0 |
| Water | 120.0 |
| Cryolite | 6.0 |
| Titanium dioxide | 50.0 |
| Special clay | 80.0 |
| Tetrasodium pyrophosphate | 2.0 |

The processing and temperatures, Formula No. 2, are as stated in the description of Process No. 1.

*Formula No. 3—Gray granules*

| | Pounds |
|---|---|
| "N" brand sodium silicate | 60.0 |
| Water | 40.0 |
| Titanium dioxide | 17.0 |
| Special clay | 30.0 |
| Tetrasodium pyrophosphate | 1.0 |
| Cryolite | 4.0 |

The granules are coated with the above mixture substantially in the manner set forth in the processing of white granules, the temperature employed in the heat treatment of the granules being also about 700° F.

*Formula No. 4—Gray granules*

| | Pounds |
|---|---|
| "N" brand aqueous sodium silicate | 48.0 |
| Water | 12.0 |
| Titanium dioxide | 17.0 |
| Special clay | 9.0 |
| Cryolite | 3.8 |

The granules are processed as aforestated, except that the temperature range for the firing is about 495–505° F.

*Formula No. 5—Gray granules*

| | Pounds |
|---|---|
| "N" brand aqueous sodium silicate | 60.0 |
| Water | 40.0 |
| Titanium dioxide | 17.0 |
| Special clay | 30.0 |
| Tetrasodium pyrophosphate | 1.0 |
| Cryolite | 4.0 |

The granules are fired at about 650° F., the processing, otherwise, being as previously described.

*Formula No. 6—Pastel green granules*

| | Pounds |
|---|---|
| "N" brand sodium silicate | 50.0 |
| Water | 10.0 |
| Green chrome oxide | 5.0 |
| Yellow iron oxide | 2.0 |
| Green phthalocyanine paste | 1.5 |
| Cryolite | 4.0 |
| Special clay | 30.0 |

In processing pastel green granules we found, by carefully made tests, that 15 pounds of titanium dioxide could be completely replaced by 30 pounds of the special clay, and that this resulted in only a very slight darkening of the color. The replacement of titanium with special clay was carried out stepwise using 15 pounds of titanium dioxide and no clay in the first test and reducing the amount of titanium dioxide to 5 pounds in each subsequent test while increasing the amount of the clay to 10 pounds in each test, as shown below:

[Amounts in pounds used per 2,000 lbs. of granules]

| | | | | |
|---|---|---|---|---|
| "N" brand Sodium Silicate | 50.0 | Same | | |
| Water | 10.0 | Same | | |
| Green Chrome Oxide | 5.0 | Same | | |
| Yellow Iron Oxide | 2.0 | Same | | |
| Green Phthalocyanine Paste | 1.5 | Same | | |
| Cryolite (Reactant) | 4.0 | Same | | |
| Titanium Dioxide | 15.0 | 10.0 | 5.0 | 0.0 |
| Special Clay | 0.0 | 10.0 | 20.0 | 30.0 |
| Firing Temperature, ° F | 500 | Same | | |
| On Cooling, 32° Bé: Aluminum Chloride | 15.0 | Same | | |
| Raw Material Cost | $9.34 | $8.50 | $7.66 | $6.82 |

*Formula No. 7—Pastel green granules*

| | Pounds |
|---|---|
| "N" brand aqueous sodium silicate | 60.0 |
| Water | 20.0 |
| Titanium dioxide | 10.5 |
| Special clay | 20.0 |
| Chromic oxide | 6.0 |
| Iron oxide yellow | 0.8 |
| Phthalocyanine green paste | 2.0 |
| Cryolite | 5.0 |

The granules are fired at about 500° F., the processing otherwise being as previously set forth.

*Formula No. 8—Red pastel granules*

[Amounts in pounds used per 2,000 lbs. of granules]

| | Pounds |
|---|---|
| "N" brand sodium silicate | 60.0 |
| Water | 25.0 |
| Red iron oxide | 7.5 |
| Cryolite (reactant) | 5.0 |
| Titanium dioxide | 10.0 |
| Special clay | 40.0 |

The granules underwent the same procedural steps as those set forth in the other examples. However, the temperature in the heat treatment was increased to about 750° F.

In the accompanying diagram,

Figure 1:
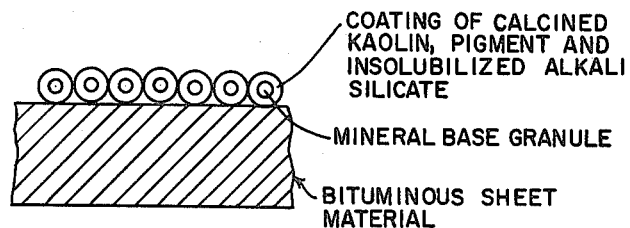
FIGURE 1 illustrates one embodiment of the invention wherein a bituminous sheet material has been coated with an adherent layer of artificially colored base granules.
Figure 2:
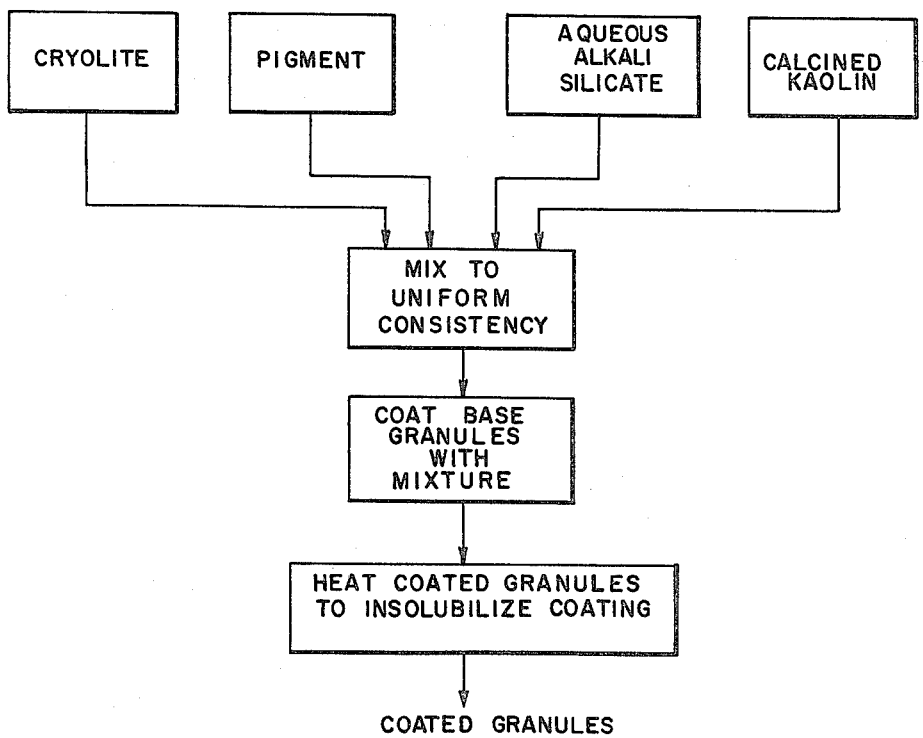
FIGURE 2 shows a flow diagram for one embodiment of the invention wherein a coating composition comprising cryolite, a pigment, aqueous alkali silicate, and calcined kaolin is applied to base granules and heated so as to insolubilize the coating.

Tests were conducted on pastel red granules in which 25 pounds of titanium dioxide were used initially in conjunction with 20 pounds of fibrous talc (magnesium silicate). The quantity of titanium dioxide employed was reduced while adding 2 pounds of clay to every pound of titanium dioxide eliminated. Tests were also made in which part of the titanium dioxide and all of the fibrous talc were replaced with the special clay. Two pounds of clay were used to replace each pound of titanium dioxide eliminated and ½ pound of clay was employed to replace each pound of fibrous talc eliminated. As in the case of the pastel green, excellent color was achieved when clay was used for titanium and/or fibrous talc replacement. Reduction of titanium dioxide in both the green and red formulations tended to result in very slightly darker and less chalky appearing colors, which were somewhat yellower in tone than those produced with the full amount of titanium dioxide. An illustration of the effects of replacing titanium dioxide with Georgia clay follows, the illustration being in the order of steps, to wit:

[Amounts in pounds used per 2,000 lbs. of granules]

| | | | | | |
|---|---|---|---|---|---|
| "N" brand Sodium Silicate | 60.0 | | Same | | |
| Water | 25.0 | | Same | | |
| Red Iron Oxide | 7.5 | | Same | | |
| Cryolite | 5.0 | | Same | | |
| Titanium Dioxide | 25.0 | 15.0 | 10.0 | 15.0 | 10.0 |
| Fibrous Talc | 20.0 | 20.0 | 20.0 | 0.0 | 0.0 |
| Special Clay | 0.0 | 20.0 | 30.0 | 30.0 | 40.0 |
| Firing Temperature, °F | 750 | | Same | | |
| On Cooling, 32° Bé: Aluminum Chloride | 20.0 | | Same | | |
| Raw Material Cost | $10.54 | $8.85 | $8.00 | $8.92 | $8.06 |

While aqueous sodium silicate is preferred, other silicates can be used with good results. The preferred grade has a ratio of $Na_2O$ to $SiO_2$ of 1:2 up to 1:3.25, for example, a silicate having a ratio of $Na_2O$ to $SiO_2$ of 1:2.22, a gravity of 41° Baumé and a solids content of 37–39 percent. A commercial example of a sodium silicate of this type is the "N" brand sodium silicate currently sold by the Philadelphia Quartz Company. Variations in the alkalinity of the silicate are permissible, but increased alkalinity raises the requirements of the insolubilizer and provides, in some cases, a small percentage of undesirable soluble alkali in the final product, while increased $SiO_2$ content reduces the film-forming properties, as well as the concentration of the silicate.

In place of tetrasodium pyrophosphate employed in our coating mixture as a dispersing agent, other dispersing agents can be used with satisfactory results, such as sodium tripolyphosphate, trisodium phosphate or equivalent compounds.

*Formula No. 9.—Snow white granules*

| | Pounds |
|---|---|
| "N" brand sodium silicate | 75.0 |
| Water | 40.0 |
| Hydrous plastic clay | 23.0 |
| Titanium dioxide | 24.0 |
| Special clay | 12.0 |
| Cryolite | 3.0 |

Granules coated with the above named dispersion are fired in a rotary kiln at a discharge temperature of not above 1500° F., preferably about 1050° F. The granules need only to be cooled when discharging from the kiln to be ready as a satisfactory commercial product.

The term "Special clay" set forth in Formula No. 9 shall be taken to mean calcined clay of the kind and form previously fully described.

The term "Hydrous plastic clay" named in Formula No. 9 shall be taken to mean (1) aluminum flake clay; (2) china clay; (3) Georgia kaolin clays, examples of which are clays manufactured by Thompson, Weinman & Company, located at McIntyre, Georgia, and sold under the trademark "Kaolloid" and "Snobrite," "Snobrite" being obtained from a nearby deposite at Toomsbury, Georgia. It shall be understood that any well-known equivalent hydrous plastic clay can be employed in lieu of the above-named clays. These clays, as called for in Formula No. 9, are reactants in an aqueous dispersion containing finely divided calcined clay and titanium dioxide, the calcined clay being an inert pigment extender and the titanium dioxide an inert pigment. When hydrous plastic clays are used as a reactant, higher temperatures are usually employed to aid the reaction. As other usable reactants, reference is made to sodium silicofluoride, aluminum fluoride, and cryolite, any one of which may be used in combination of hydrous plastic clay to give satisfactory results.

Stated in the exacting light of the herein disclosure, the gist of the invention is a mineral surfacing granule characterized by its colored weather resisting coating consisting essentially of finely divided inert clay and titanium dioxide pigment bonded to the surface of the granule by a binder of an alkali silicate, the relative amounts of the clay and the titanium dioxide being such, as definitely to leave on the granule a structurally strong, weather resisting light colored film characterized by its opacity, brightness and light reflective properties. Importance attaches to features of the invention enabling artificially coloring mineral surfacing granules at any one of a relatively large range of temperatures, in each case, appreciably below the fusion point of sodium silicate, and whereby a large variety of much desired and sought for light colors are obtainable. In each of the disclosed embodiments of our invention, finely divided calcined clay and titanium dioxide are essential and primarily depended upon in an aqueous solution of sodium silicate and one or more reactants, the latter in kind and number according to the nature of the base granule being treated.

The effective range of temperature is from slightly above 495° F. in carrying out the invention, Formula No. 4, to not above about 1050° F., the latter being the temperature given in Formula No. 9 for the production of substantially "Snow white" granules characterized by their low hygroscopicity and alkalinity.

In the first above stated formulations, the firing temperatures are all thereof appreciably under 1000° F. as distinguished from the higher temperature when the coating dispersion is as given in Formula No. 9, wherein, at this higher temperature with the reactants therein named or their well known equivalents, the resultant coating alkalinity is very much reduced and the coating characterized by its low hygroscopicity as compared with coatings in which the binder is neutralized with acidic salt solutions. This has the functional advantage, which is, that the granules more firmly embed and become permanently attached to asphalt and, therefore, are not subject to loss when exposed to large quantities of water in the fabrication of sheet roofing.

The types of base granule mineral material coated and processed according to the herein disclosed formulas are:

Formula No. 1—Greenstone or andesite
Formula No. 2—Diabase
Formula No. 3—Diabase
Formula No. 4—Green slate
Formula No. 5—Diabase
Formula No. 6—Greenstone or andesite
Formula No. 7—Diabase
Formula No. 8—Greenstone or andesite
Formula No. 9—Diabase It is obvious that other bases previously described such as argillite, rhyolite, or other igneous rocks well known in the art, may be used as base granule material.

We particularly stress the importance of our discovery of a special clay, an inert material which is more than equal in the purpose it serves than greater amounts of expensive materials such as finely divided hydrated alumina and titanium dioxide. There attaches to this discovery the established fact that it has properties which, by standard reflectance measurements, show greater lightening and brightening action than with any materials required to be used in prior methods for hiding the dark color of the base granule. The inexpensive, special clay employed herein as a lightening agent possesses all those properties which enable the manufacture of granules embracing a very large range of light colors, from a substantially snow white to sought for colors classified as pastels.

We have disclosed in combination with an inert clay, inert pigments comprising titanium dioxide, red iron oxide, chrome oxide, yellow iron oxide and phthalocyanine; and it is understood that any well known pigments, capable of withstanding the temperatures employed, can be used. Any suitable, well known pigment dispersant may be used in place of tetrasodium pyrophosphate. The special clay used in our method is an inert, low cost, extending pigment. Cryolite, employed as a reactant with the silicate, may be replaced with other reactants.

Regarding the special clay used in our process, the terms clay, special clay, "Georgia" clays or blends of clays, shall be construed to include a compound comprising substantially the ingredients set forth in the analysis of the herein-disclosed clay, or their equivalents, in kind, form and particle size.

What we claim is:
1. As a new article of manufacture, mineral roofing granules having on their surfaces, a light-colored opaque, coating comprising finely divided calcined kaolin of an average particle size of 1.2 microns, and a light-colored pigment, said finely divided calcined kaolin and the pigment bonded in a weather-resisting film of an insolubilized alkali silicate and firmly attached to the granule surfaces.

2. Light-colored roofing granules having on their surfaces a weather-resisting coating consisting of titanium dioxide and finely divided calcined kaolin of an average particle size of 1.2 microns, the titanium and said finely divided calcined kaolin being in relative proportions sufficient to hide the natural color of the granule and bonded in an insolubilized film of an alkali silicate and firmly attached to the surfaces of the granules.

3. Light-colored roofing granules comprising a mineral base granule coated with coloring pigment, titanium dioxide and, per ton of granules, from about 9–80 lbs. of finely divided calcined kaolin, of an average particle size of 1.2 microns, bonded in a weather-resisting and water insoluble silicate matrix to the surfaces of the granule.

4. Light-colored roofing granules having a well bonded substantially water-insoluble, light-colored surface-coating comprising a heat sensitive pigment which exhibits permanent change of color when heated above a temperature of the order of 600° F., and finely divided calcined kaolin of an average particle size of 1.2 microns, said coating being bonded to the granule in a weather-resisting and water-insoluble silicate matrix.

5. As a new article of manufacture, light-colored mineral roofing granules coated on their surfaces with approximately from 9–80 lbs. per ton of granules, of finely divided calcined kaolin of an average particle size of 1.2 microns and titanium dioxide in an amount approximately ranging from 10–50 lbs. per ton of granules, said finely divided calcined kaolin and the titanium dioxide being contained in an insolubilized film of an alkali silicate and firmly bonded to the surfaces of the granules.

6. Light-colored mineral roofing granules having on their surfaces, a coating essentially consisting of a light-colored pigment, finely divided calcined kaolin, the particle form of which is virtually amorphous and of an average particle size of 1.2 microns, and an inorganic bond, consisting essentially of an insolubilized alkali silicate.

7. The method of manufacturing weather-resisting and substantially water-insoluble light-colored mineral roofing granules comprising coating the granules with a lightening, brightening and opacifying composition consisting of light-colored pigment and finely divided calcined kaolin of an average particle size of 1.2 microns and a bonding composition comprising an aqueous alkali silicate; heating the granules to temperatures approximately within the range of 495°–750° F. to substantially completely dehydrate the silicate and firmly attach the lightening, brightening and opacifying composition to the surfaces of the granules; and applying to the granules a solution of an insolubilizing agent selected from the group consisting of aluminum chloride, aluminum nitrate, hydrochloric acid and nitric acid.

8. The method of manufacturing colored roofing granules comprising coating the granules with a lightening, brightening, and opacifying composition of a coloring pigment and finely divided calcined kaolin of an average particle size of 1.2 microns and a bonding composition comprising an aqueous alkali silicate, heating the coated granules to a temperature sufficient to substantially completely dehydrate the silicate but insufficient to impair the color of the pigment; and applying to the granules a solution of an insolubilizing agent selected from the group consisting of aluminum chloride, aluminum nitrate, hydrochloric acid and nitric acid.

9. The method according to claim 8, wherein the coating composition consists essentially of the following substances and proportions thereof:

| | Lbs. |
|---|---|
| "N" brand aqueous sodium silicate | 110.0 |
| Water | 100.0 |
| Tetrasodium pyrophosphate | 2.0 |
| Titanium dioxide | 50.0 |
| Finely divided calcined kaolin | 80.0 |
| Cryolite | 6.0 | and wherein the temperature to which the granules are heated is not substantially above 700° F.

10. The method according to claim 8, wherein the lightening, brightening and opacifying composition and the bonding composition respectively consist of the following substances and proportions:

| | Lbs. |
|---|---|
| "N" brand aqueous sodium silicate | 110.0 |
| Water | 120.0 |
| Cryolite | 6.0 |
| Titanium dioxide | 50.0 |
| Finely divided calcined kaolin | 80.0 |
| Tetrasodium pyrophosphate | 2.0 | and wherein the temperature to which the granules are heated is not substantially above 700° F.

11. The method according to claim 8, wherein the lightening, brightening and opacifying composition and the bonding composition respectively consist of the following substances and proportions:

| | Lbs. |
|---|---|
| "N" brand sodium silicate | 60.0 |
| Water | 40.0 |
| Titanium dioxide | 17.0 |
| Finely divided calcined kaolin | 30.0 |
| Tetrasodium pyrophosphate | 1.0 |
| Cryolite | 4.0 | and wherein the temperature to which the granules are heated is not substantially above 700° F.

12. The method according to claim 8, wherein the lightening, brightening and opacifying composition and the bonding composition respectively consist of the following substances and proportions:

| | Lbs. |
|---|---|
| "N" brand sodium silicate | 48.0 |
| Water | 12.0 |
| Titanium dioxide | 17.0 |
| Finely divided calcined kaolin | 9.0 |
| Cryolite | 3.8 | and wherein the temperature to which the granules are heated is substantially from 495° to 505° F.

13. The method according to claim 8, wherein the lightening, brightening and opacifying composition and bonding composition respectively consist of the following substances and proportions:

| | Lbs. |
|---|---|
| "N" brand sodium silicate | 60.0 |
| Water | 40.0 |
| Titanium dioxide | 17.0 |
| Finely divided calcined kaolin | 30.0 |
| Tetrasodium pyrophosphate | 1.0 |
| Cryolite | 4.0 | and wherein the temperature to which the granules are heated is not substantially above 650° F.

14. The method according to claim 8, wherein the lightening, brightening and opacifying composition and the bonding composition respectively consist of the following substances and proportions:

| | Lbs. |
|---|---|
| "N" brand sodium silicate | 50.0 |
| Water | 10.0 |
| Green chrome oxide | 5.0 |
| Yellow iron oxide | 2.0 |
| Green phthalocyanine paste | 1.5 |
| Cryolite | 4.0 |
| Finely divided calcined kaolin | 30.0 | and wherein the temperature to which the granules are heated is not substantially above 500° F.

15. The method according to claim 8, wherein the lightening, brightening and opacifying composition and the bonding composition respectively consist of the following substances and proportions:

| | Lbs. |
|---|---|
| "N" brand sodium silicate | 60.0 |
| Water | 20.0 |
| Titanium dioxide | 10.5 |
| Finely divided calcined kaolin | 20.0 |
| Chromic oxide | 6.0 |
| Iron oxide yellow | 0.8 |
| Phthalocyanine green paste | 2.0 |
| Cryolite | 5.0 | and wherein the temperature to which the granules are heated is not substantially above 500° F.

16. The method according to claim 8, wherein the lightening, brightening and opacifying composition and the bonding composition respectively consist of the following substances and proportions:

| | Lbs. |
|---|---|
| "N" brand sodium silicate | 60.0 |
| Water | 25.0 |
| Red iron oxide | 7.5 |
| Cryolite | 5.0 |
| Titanium dioxide | 10.0 |
| Finely divided calcined kaolin | 40.0 | and wherein the temperature to which the granules are heated is not substantially above 750° F.

17. The method of manufacturing roofing granules from dark-colored mineral base granular material which consists in covering the base granules with an aqueous dispersion of an alkali silicate, cryolite, and light-colored pigment and finely divided calcined kaolin, the kaolin having an average particle size of 1.2 microns and reflectance measurements of the order of 90–92 percent as determined by a General Electric photoelectric reflection meter, the finely divided calcined kaolin and the light-colored pigment being in proportions sufficient to sensibly completely hide the dark surfaces of said base granules; and heating the base granules to react the cryolite with and insolubilize the silicate and firmly bond the finely divided calcined kaolin and the light-colored pigment to the surfaces of said base granules.

18. Roofing granules comprising mineral base granules of natural dark color having bonded to the surfaces thereof in a weather-resisting and substantially water-insoluble silicate film, a composition comprising coloring pigment and finely divided calcined kaolin of an average particle size of 1.2 microns, said composition, bonded as aforestated to the surfaces of the base mineral granules, being of a thickness to sensibly completely hide the dark color of and lighten and brighten said base mineral granules.

19. The method of manufacturing light-colored roofing granules from dark colored mineral base granules comprising coating the granules with an aqueous solution of sodium silicate, finely divided calcined kaolin of an average particle size of 1.2 microns, and one or more reagents selected from the group consisting of hydrous plastic clays and cryolite, and heating the coated granules to a temperature within the range of from 495°–1050° F., to react the silicate with the cryolite and firmly bond the pigment and the finely divided calcined kaolin to the surfaces of the granules by a weather-resisting silicate matrix, the pigment and the finely divided calcined kaolin being in relative proportions sufficient to hide the dark surfaces of the granules.

20. Weather-resistant and bloom-resistant artificially colored roofing granules comprising a mineral base granule coated with a well-bonded, substantially non-alkaline and water-insoluble surface coating comprising anhydrous aluminum silicate of an average particle size between approximately 1 and 40 microns, a pigment, and an inorganic bond, said bond consisting essentially of an insolubilized alkali silicate, said anhydrous aluminum silicate and said insolubilized alkali silicate being chemically essentially unreacted in said coating.

21. Decorative sheets adapted for use as a roofing material and comprising a bituminous sheet material surface coated on at least one side with an adherent layer of weather-resistant and bloom-resistant artificially colored granules comprising a mineral base granule having a well-bonded, substantially non-alkaline and water-insoluble surface coating comprising ingredients which are chemically essentially unreacted in said coating, said ingredients including an anhydrous aluminum silicate of an average particle size between approximately 1 and 40 microns, a pigment, and an inorganic bond, said bond consisting essentially of an insolubilized alkali silicate.

22. The method of coating base mineral granules with well-bonded "color fast" coatings comprising forming on said base granules a coating of a fluid, film-forming slurry containing a pigment, an alkali silicate, and anhydrous aluminum silicate of an average particle size between approximately 1 and 40 microns, the amount of said anhydrous aluminum silicate being not in excess of double the amount of alkali silicate solids in said slurry, drying said coating at a raised temperature up to 600° F., thereby to maintain the ingredients of said coating chemically essentially unreacted, and treating the dried coating with a sufficient quantity of a water solution of an alkali-reactive, acidic pickling compound so as to insolubilize said coating, thereby to obtain a well-bonded, abrasion-resistant, and shock-resistant coating of high color permanence.

References Cited in the file of this patent

UNITED STATES PATENTS

| | | |
|---|---|---|
| 2,158,987 | Maloney | May 16, 1939 |
| 2,379,358 | Jewett | June 26, 1945 |
| 2,553,604 | Pole | May 22, 1951 |
| 2,695,851 | Lodge | Nov. 30, 1954 |
| 2,732,311 | Hartwright | Jan. 24, 1956 |
| 2,943,002 | Lanseth | June 28, 1960 |

UNITED STATES PATENT OFFICE

CERTIFICATE OF CORRECTION

Patent No. 3,169,075                       February 9, 1965

George W. Morrow, Jr., et al.

It is hereby certified that error appears in the above numbered patent requiring correction and that the said Letters Patent should read as corrected below.

Column 3, line 6, for "grandules" read -- granules --; column 4, line 73, for "les" read -- less --; column 5, line 22, for "1:2.22" read -- 1:3.22 --; line 60, for "deposite" read -- deposit --; column 10, lines 8 to 10, strike out "one or more reagents selected from the group consisting of hydrous plastic clays and".

Signed and sealed this 6th day of July 1965.

(SEAL)
Attest:

ERNEST W. SWIDER                        EDWARD J. BRENNER
Attesting Officer                          Commissioner of Patents